United States Patent Office 3,297,529
Patented Jan. 10, 1967

3,297,529
MAGNESIUM SULFATE STABILIZED
CHOLINE SALICYLATE
Philip A. Berke, Millburn, N.J., assignor to Sutton Laboratory Inc., Roselle, N.J., a corporation of New Jersey
No Drawing. Filed Nov. 25, 1964, Ser. No. 414,016
15 Claims. (Cl. 167—65)

This invention relates to a new composition of matter and to the method of preparing the same, and in particular to a combination of choline salicylate and magnesium sulfate. The composition is of value for its antipyretic and analgesic properties.

It is an object of this invention to provide a new choline salicylate composition having desirable physical form and useful physiologic properties.

It is a further object of the present invention to provide a new pharmaceutical preparation of chloline salicylate, and in particular to provide solid preparations of choline salicylate suitable for granulating, tableting and encapsulating.

Choline salicylate is well known to have desirable physiologic properties as described in the paper by Robert H. Broh-Kahn, M.D., entitled: "Symposium on Choline Salicylate," and published in the International Record of Medicine, vol. 173, No. 4, pp. 217–232, April 1960. The preparation and uses of choline salicylate have been the subject of several United States patents particularly those of Broh-Kahn et al., U.S. 3,069,321, and Lorz et al., U.S. 3,141,035, in which the preparation of solid crystalline choline salicylate has been described. The crystallization process, as described, requires the use of anhydrous organic solvents which are expensive and must be kept anhydrous. The crystallization of the final product is difficult because of the extreme hygroscopicity of the product.

Because of its deliquescence choline salicylate is extremely difficult to handle. Unless it is kept in a completely dry atmosphere, it very quickly absorbs water and becomes amorphous, sticky and finally liquid. As a result it is not feasible to maintain choline salicylate in the solid state. It is for this reason that therapeutic doses of choline salicylate must be dispensed in liquid form usually as an aqueous solution.

It is well known that the handling and dispensing of liquid preparations is more difficult than of solids. Liquids must be bottled which is expensive and is usually accompanied by breakage and spillage. There is also the uncertainty inherent in the dispensing of a uniform dosage. A solid dry stable preparation would overcome these disadvantages especially in the administration of a uniform dose.

Many attempts have been made in the past to find some means of handling choline salicylate in dry form suitable for the preparation of tablets and capsules. None of these attempts up to the present have fully answered the problems which are associated with this material. Various carriers have been proposed, but where it might be possible to maintain the choline salicylate in a dry state, it is not possible to incorporate a sufficient quantity of the choline salicylate on the carrier to give a therapeutic dose in the form of a tablet or capsule. The finished tablet or capsule of choline salicylate containing a sufficient amount of active material to fulfill its therapeutic purpose would be of such bulk or size as to make it impractical to ingest. Also many carriers are objectionable from the standpoint of cost, taste, smell, bulk, etc. The present invention overcomes all of these objections. Up to the present time no suitable combination or process for the preparation of dry choline salicylate for the production of tablets or capsules has been found and it is the purpose of the present invention to describe such a combination and the method of preparation.

We have found that choline salicylate and magnesium sulfate when properly combined, as described below, will give a dry free flowing solid which is substantially stable and which is suitable for the preparation of tablets or capsules. We have also found that this product may be prepared by mixing the ingredients in water and drying the solution thus eliminating the use of expensive organic solvents and at the same time making it possible to prepare the dry product with varying amounts of choline salicylate. We have prepared products containing as high as 78% of choline salicylate, as a dry free flowing product. It will be understood that this limit is not sharply critical and that improvements are obtained by admixing any significant amount of magnesium sulfate with the choline salicylate.

Fundamentally the process comprises the mixing of an aqueous solution of choline salicylate with an aqueous solution of magnesium sulfate each component being present to give a final product having the desired concentration of choline salicylate. Alternatively the magnesium sulfate may be added as a solid to the aqueous solution of choline salicylate and the mixture agitated until the magnesium sulfate has dissolved to give a homogeneous solution. In either case the solution so obtained is evaporated to dryness and the solid obtained is powdered in a suitable mill to the desired particle size. Preferably, the solution is evaporated to dryness in vacuo at a temperature below 100° C. Other drying methods, as will occur to those skilled in the art may be used. In any event the moisture should be reduced below about 4% in the product.

The final composition of the solid product is a function of the ratio of choline salicylate and magnesium sulfate used. In a preferred embodiment the composition may vary from 25 to 80% choline salicylate with the remainder being magnesium sulfate.

While we do not wish to be bound by any theory as to the reasons for the beneficial result, there are indications that the magnesium sulfate and choline salicylate may form a loose complex or adduct upon heating in solution.

The product may be granulated with the usual excipients and pressed into tablets or may be encapsulated in gelatin or the like. The dosage unit may be varied as desired but usually is in the range of about 0.1 to 2.0 grams.

The invention is further illustrated by the following representative examples of practice:

*Example I*

495 grams of a solution containing 91% by weight of choline salicylate in a suitable reaction vessel were diluted with 150 ml. of water and 150 grams of hydrated magnesium sulfate (equivalent to 98.7 grams of anhydrous magnesium sulfate) were added with stirring. The mixture was then heated to 80° C. with agitation whereupon a clear solution resulted. The solution was filtered hot to remove any extraneous matter and then dried in vacuo at 80° C. The dry brittle solid obtained was easily powdered and contained 78% choline salicylate on assay.

*Example II*

The materials used were identical to those given in Example I, but the magnesium sulfate was first dissolved in the water and the two solutions were mixed with agitation and the homogeneous mixture then dried in vacuo.

*Example III*

13.6 pounds of a 92% solution of choline salicylate were mixed with 12.5 pounds of hydrated magnesium sul-"

fate. The mixture was stirred until uniform and then dried in vacuo at 80° C. The resulting solid was powdered to give a dry free flowing solid which assayed 48% choline salicylate.

*Example IV*

Similarly, as in Example III, 42.5 grams of choline salicylate and 25 grams of hydrated magnesium sulfate gave 63 grams of dry free flowing product containing 60% choline salicylate.

*Example V*

Measured portions of each of the solid products of Examples I–IV are pressed into tablets by conventional tableting procedure to provide tablets containing dosage units of 558 mg. choline salicylate. This is approximately the equivalent, with respect to salicylic acid content, of a 5 grain aspirin tablet.

*Example VI*

Measured portions of each of the foregoing solid products are encapsulated in gelatin to provide dosage units of 558 mg. of choline salicylate.

It is to be understood that various changes may be made in the proportions of the choline salicylate and magnesium sulfate and in the dosage units in the tablets and capsules, without departing from the scope of the invention. The dosage can be varied and standardized as desired and the usual adjuvants and excipients can be used. It will be apparent that the new dry composition provides many advantages over the liquid form.

I claim:

1. A solid composition comprising a combination of choline salicylate and a stabilizing amount of magnesium sulfate.

2. A substantially stable solid composition in dry free flowing form comprising a combination of choline salicylate and magnesium sulfate.

3. A solid choline salicylate composition containing magnesium sulfate in sufficient quantity to maintain the composition in stable free flowing form.

4. A solid composition containing less than about 4% moisture and comprising from about 25% to 80% choline salicylate with the remainder being magnesium sulfate.

5. The product of claim 4 wherein the composition contains approximately 78% choline salicylate.

6. The product of claim 4 wherein the composition contains approximately 60% choline salicylate.

7. The product of claim 4 wherein the composition contains approximately 48% choline salicylate.

8. A tablet containing a combination of choline salicylate and a stabilizing amount of magnesium sulfate.

9. A capsule containing a combination of choline salicylate and a stabilizing amount of magnesium sulfate.

10. A process for the preparation of choline salicylate in dry free flowing form comprising heating a solution of choline salicylate and magnesium sulfate, evaporating the solution and drying the residue.

11. A process for the preparation of choline salicylate in dry free flowing form comprising adding magnesium sulfate to an aqueous solution of choline salicylate, heating the mixture to obtain a homogeneous solution, filtering the solution and evaporating it to dryness at a temperature below 100° C.

12. The process of claim 11 wherein the magnesium sulfate is added as an aqueous solution.

13. The process of claim 11 wherein the magnesium sulfate is added as a solid hydrate.

14. The process of claim 11 wherein the magnesium sulfate is added in anhydrous form.

15. A process for the preparation of choline salicylate in dry free flowing form comprising adding magnesium sulfate to an aqueous solution of choline salicylate in proportions of approximately 20% to 75% with respect to the choline salicylate, heating the mixture to approximately 80° C. to obtain a homogeneous solution, filtering the solution and evaporating it to dryness under vacuum at a temperature of approximately 80° C.

No references cited.

JULIAN S. LEVITT, *Primary Examiner.*

STANLEY J. FRIEDMAN, *Assistant Examiner.*